Jan. 30, 1962 H. P. BOSWAU 3,019,297
PARTY LINE IDENTIFICATION APPARATUS
Filed June 22, 1959
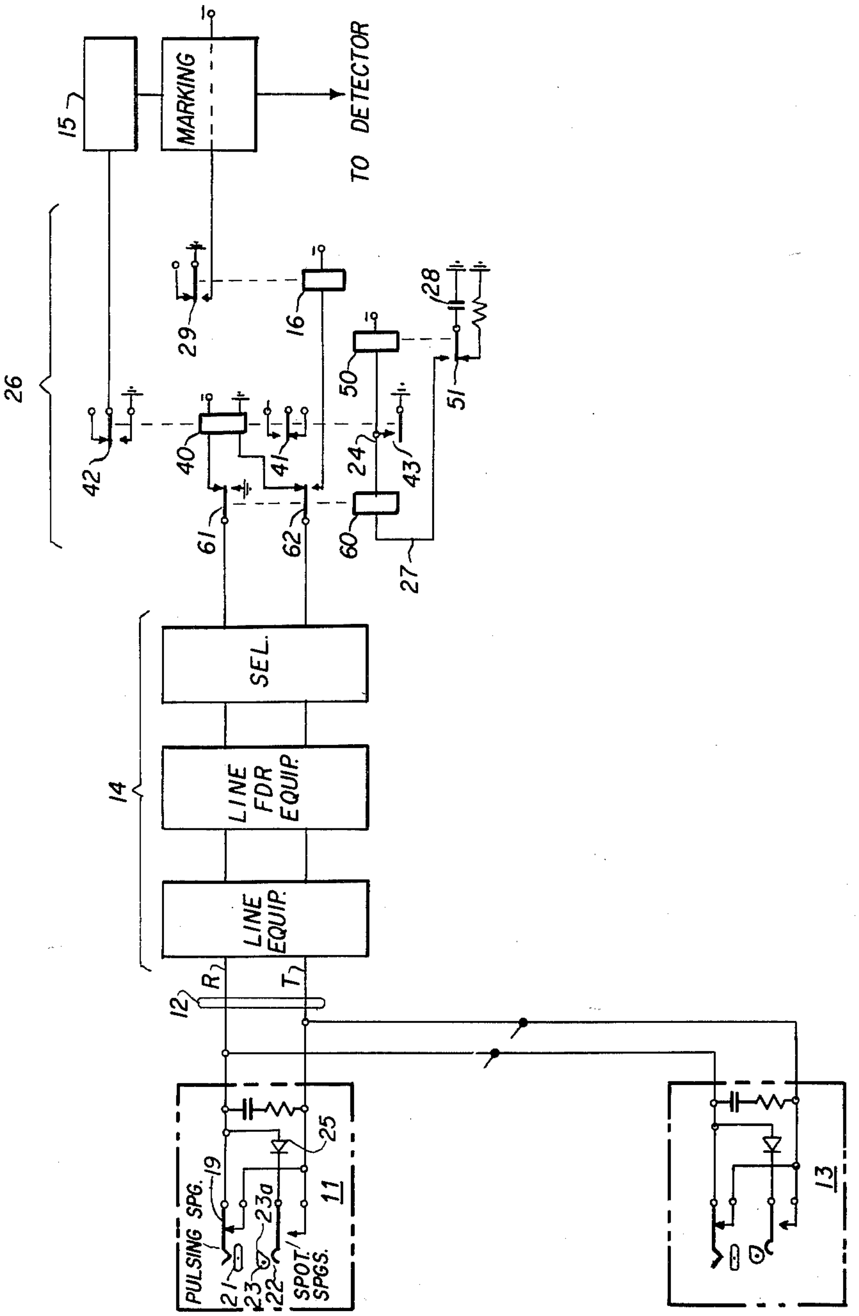
INVENTOR.
Hans P. Boswau
BY C. R. Sipe
Atty.

3,019,297
PARTY LINE IDENTIFICATION APPARATUS

Hans P. Boswau, Los Altos, Calif., assignor to Leich Electric Company, Genoa, Ill., a corporation of Illinois Filed June 22, 1959, Ser. No. 821,850
8 Claims. (Cl. 179—17)

The present invention pertains to automatic telephone systems, and particularly to a new and novel means for identifying a calling station on a party line during the dialing of called number without substation ground.

Party identification schemes have, in the past, been dependent either upon sending a ground pulse from the substation at a predetermined point in the dialing cycle or conditioning an identifying circuit for operation by a digit dialed in an access code. It is sometimes difficult to establish and maintain a reliable ground connection at some substation locations and methods of identification which are dependent upon a substation ground are therefore not satisfactory. The identification schemes which mutilate one or more of the dial pulses are not satisfactory even though they may get away from the use of substation ground because the present trend is away from the use of access code except for direct distance dialing and a mutilated digit obviously cannot be utilized for any purpose other than party line identification.

Accordingly, it is a primary object of this invention to provide a telephone system with a calling party identification system operable without substation ground.

Another object of this invention is to provide a two-conductor party line in a telephone system with station identification in terms of the serial position of a spotter pulse transmitted over the two conductors.

Still another object of this invention is to provide a party line identification system operable without mutilation of any dial pulse.

A further object of this invention is to provide each party line substation with means conditioned by the central office equipment to transmit a pulse for identification of the substation.

A still further object of this invention is to provide an automatic telephone system with means adapted to identify the calling station on a party line without using an access code or a substation ground.

These and other objects of the invention will be apparent to one skilled in the art from the following detailed description when read in conjunction with the drawing, which is a schematic representation of a telephone system embodying the invention.

This invention is intended to be used in an automatic toll ticketing telephone system and may be utilized either wherein the calling party dials an access code or during the dialing of the station number provided certain combinations of numbers are not used. For identification of a 10-party line without dialing zero, the system embodying this invention may be used providing all station number numbers consisting entirely of the digits 1 and 2 and 3 are eliminated. The elimination of the numbers consisting of the digits 1, 2, and 3 from a 10,000-line exchange renders 81 such numbers unsuitable for service.

An example of a system in which the present invention may be used is described in detail in a copending U.S. application, Serial No. 628,474, filed December 3, 1956 by John E. Ostline et al., which application is made a part hereof by reference.

In general operation of the system, a calling station on a party line initiates a call and actuates line equipment to extend a line loop through a pulsing relay. The pulsing relay extends the loop through various equipments to the called party in accordance with the directory number dialed by the calling party. The party line identification means of this invention operates in conjunction with the operation of the line relay and under the control of a spotter mechanism in the substation which closes a normally open contact in a portion of the loop circuit at a predetermined point in the dialing cycle, each predetermined point or combination of points being peculiar to one station on a party line, to indicate the calling party on a party line to the detector mechanism in the telephone system.

This same station identification means may be utilized with either the type A SATT system which does not use an access code or with the type B SATT system which does use the access code wherein the last code digit is a zero. No alteration is required in the equipment of this invention for use in either system. The identification system for use in the type A SATT system utilizes identification marking during one or two of four different pulses to attain 10-party identification while the system intended for use with the type B SATT system identifies the calling station by sending an identification pulse during any one of the ten digital pulses attendant upon the dialing of the digit zero. The serial location of the identification pulse is in accordance with a location assigned to each station on the party line. The operation of the party line identification system of this invention is described in conjunction with equipment in a type B SATT system and will accordingly operate on the dialing of the digit zero in the access code and will operate with a single projection on the spotter cam to close a marking relay at a predetermined point in the dialing cycle.

The identification means comprises a marking relay adapted to be actuated at a predetermined point in a series of digital impulses by the insertion of a shunt circuit around the pulsing contacts in a conventional line loop, the shunt circuit being conductive in one direction only so as to prevent actuation of the pulsing relay therethrough. The pulsing relay and the marking relay operate on currents of opposite polarity. The marking relay is prepared for operation during the open period of each pulse by a conditioning relay which momentarily reverses the flow of current in the line loop. The selective operation of the marking relay is controlled by the spotter cam in the substation which is preset to close during a portion of one of the ten digital impulses attendant upon the dialing of zero.

Referring now to the drawing, the system embodying this invention includes a substation 11 on a party line 12 with a plurality of other stations indicated generally at 13, switch-through equipment indicated at 14, a register 15 which is advanced one increment by each release of the line relay, and a marking relay 16 in a ticketer (not shown).

Each substation 11 includes conventional normally closed pulse contacts 19 adapted to be operated by an impulse cam 21 in response to the rotation of a dial, and normally open spotter contacts 22 in a shunt circuit connected in parallel with the pulse contacts. The shunt circuit is adapted to conduct current in one direction only by inclusion of a unidirectional conductor 25 therein. A spotter cam 23 is associated with the spotter contacts and has a projection 23*a* positioned thereon to close the contacts 22 at a predetermined point in a dialing cycle. The spotter cam 23 is rotated in timed relationship with the impulse cam 21 to assure closing of the spotter contact 22 at a predetermined serial position in the dialing of a series of digital impulses.

A pulsing or line relay 40 is included in the line loop and is responsive to the opening and closing of the digital impulse springs to operate a pulsing contact 41 to control the extension of a call in the well known manner for telephone systems, a make contact 42 to step the register 15 for each pulse and a make contact 43 for initiation of a timing or control circuit 24. A battery-connected relay 50 in the control means 24 is adapted to be operated when the line relay 40 operates to close its contact 43. The closing of contact 43 also passes ground through the winding of the conditioning relay 60 which does not operate, and a conductor 27 to a capacitor 28 which is connected in series with relay 60 by the closing of a make contact 51 upon the operation of the relay 50. The conditioning relay 60 is momentarily operated, when the line relay 40 releases, by the opening of the contact 43 to remove the ground potential from one side of the relay 60.

Operation of the relay 60 closes its contacts 61 and 62 to reverse the direction of flow of current in the two conductors of the line and to prepare an operating circuit thereover for a marking relay 16. The operating circuit for the marking relay 16 is from ground through the make contact 61 on relay 60, the spotter contacts 22, the make contacts 62, and the battery-connected winding on the marking relay 16.

During the time that the capacitor 28 has ground potential connected to both sides, it is effectively discharged. Upon removal of the ground at contact 43, there is a momentary flow of current until the capacitor is charged. The duration of operation of the conditioning relay is therefore a function of charge time of the capacitor and operating time of the relay so as to give a controlled duration to the test function performed by the relay—in the present illustration, 20 milliseconds of the 60 millisecond open period of the pulse contacts which is ample time to perform the recording function when the spotter contacts are closed.

The relay 50 is operated upon each operation of the pulsing relay and closes its contact 51 to insert the capacitor 28 in series with the operating winding of the conditioning relay 60. The conditioning relay 60 is therefore operated each time that the line relay 40 releases to condition the above-described operating circuit for the marking relay 16.

The marking may be accomplished in any one of numerous well known manners such as operating a register 15 from the line relay and recording the position thereof by means of the contact 29 on the marking relay or by sending a pulse to the detector circuit in the ticketer which will register the calling party in accordance with the serial position of the pulse relative to a series of ten digital impulses.

In operation, the first two digits of an access code are dialed to operate the line relay 40 to extend the call to a ticketer (not shown). The digit zero is then dialed by the calling party and the impulse springs 19 are opened ten times by the impulse cam 21 to operate the line relay 40 ten times. The relay 50 and the conditioning relay 60 operate during each pulse as described above but the marking relay 16 is not operated until the spotter springs 22 are closed by the spotter cam 23 to complete the operating circuit.

Assuming that the calling station is the fifth station identified by a marking pulse during the fifth digital pulse, the line relay 40 is operated upon closing of the hookswitch from ground through its lower winding, the line loop including the pulse contacts 19, and its upper winding to battery. This initial operation of the line relay 40 closes its make contact 41 and operates the relay 50 to completely discharge the capacitor 28. The impulse cam 21 then opens the contacts 19 to send the first digital pulse out over the line loop. The opening of the line loop at the contacts 19 releases the relay 40 removing ground from the conductor thereby removing the short circuit from the winding of the relay 60 and operating it during charging of the capacitor 28 through the winding of the battery-connected relay 50. Operation of the relay 60 closes its contacts 61 and 62 to prepare an operating circuit for the marking relay 16. The relay 16 does not operate at this time because the spotter springs 22 are not closed. The subsequent digital pulses are similarly sent to the line relay 40, and the relay 60 similarly tests for the closure of the spotter springs 22, as described above, on each pulse.

During the period that the pulse springs 19 are opened for the fifth time, the spotter cam 23 closes the spotter springs 22 and momentarily establishes a possible operating path for the line relay 40 from ground through the lower winding of the relay to the contact 62 of relay 60, not yet operated, through the spotter springs 22, the contacts 61 and the upper winding to battery. Because of the characteristics of the unidirectional conductor 25, current is not permitted to flow in this direction and the line relay is permitted to release. Upon release of the line relay 40, an operating circuit is completed to the marking relay 16 from ground through the contact 61, unidirectional conductor 25, spotter springs 22, contact 62, and its battery connected winding. Operation of the marking relay 16 closes its contact 29 to mark the position of the projection on the cam 23 to indicate the calling station in terms of the serial position of the marking pulse relative to the series of ten digital impulses.

The complete marking operation takes place during the normal open period at springs 19 so that the normal operation of the line relay 40 is not affected and the series of digital impulses may be used for other purposes such as extension of the call. The non-mutilation of digital impulses is of primary importance where this identification system is to be utilized in an automatic telephone system which does not require an access code. As pointed out above, this same circuit may be utilized during the dialing of the station number by the elimination of numbers consisting entirely of the digits 1, 2, or 3 and assigning identification codes to the station comprising one or two marking up pulses in predetermined positions.

While the present invention has been described in a particular embodiment, it should be understood that various modifications can be made therein without departing from the spirit and scope of my invention as defined in the appended claims.

What is claimed is:

1. In a telephone system: a two-conductor party line including a plurality of subscriber stations, each having an individual designation in terms of a serial position of a spotter pulse; a line relay; a loop circuit completed over said two conductors for operating the line relay upon initiation of a call from one of said stations; normally closed pulse contacts electrically connected between said two conductors; normally open spotter contacts connected in parallel with the pulse contacts; a unidirectional conductor connected between said pulse contacts and said spotter contacts to block the normal flow of current in the line loop to said spotter contacts; dial means at said substation operated to open and close said pulse contacts at regular intervals to generate a series of regular impulses to alternately release and reoperate said line relay; means controlled by said dial means to close said spotter contacts in accordance with the individual designation of the dialing station; an operating circuit including said spotter contacts responsive to the operation and release of the line relay to reverse the polarity of the potential applied to said two conductors; and means controlled by said operating circuit for recording the serial position of each pulse during which said spotter contacts are closed.

2. In a telephone system having a two-conductor party line, the party line including a plurality of subscriber stations each adapted to be connected to a line relay by a two-conductor line loop completed upon initiation of a call therefrom and having dial means operated to generate a series of regular impulses to release and reoperate the line relay accordingly, a station identification means comprising: a shunt circuit in said line loop in parallel with said dial means; registering means set in accordance with each release of the line relay; means for marking the position of said registering means; an operating circuit including said two conductors and said shunt circuit prepared to operate said marking means by each sequential operation and release of said line relay; means for closing said shunt circuit during a preselected release period of said line relay to complete said operating circuit; and means controlled by said operating circuit to actuate said marking means to record the position of said registering means.

3. In a telephone system including a central office and a plurality of subscriber stations on a party line, each station having a corresponding individual designation in terms of the serial position of a spotter pulse: a line relay; a loop circuit completed to operate said line relay upon initiation of a call from one of said stations; dial means to open and close said line loop at measured intervals to alternately release and reoperate said line relay; means responsive to the sequential operation and release of said line relay for extending ground from the central office to the calling station during the release period of said line relay; battery connected marking means; and means for extending said ground potential to said marking means in accordance with said individual designation.

4. In a telephone system having a plurality of subscriber stations on a two-conductor party line, means to identify a calling station in terms of the serial position of a spotter pulse in a series of digital impulses generated at each station comprising: a line relay; a loop circuit including the two conductors completed upon initiation of a call from one of said stations to operate said line relay, said loop circuit having current flowing in a predetermined direction therein; normally closed pulse contacts in said loop circuit; normally open spotter contacts connected in parallel with said pulse contacts; a unidirectional conductor serially connected in said loop circuit between said spotter contacts and said pulse contacts to prevent completion of a conducting path for current in said predetermined direction by the closure of said spotter contacts; dial means operated to open and close said pulse contacts at regular intervals to alternately release and reoperate said line relay accordingly; means controlled by said dial means to close said spotter contacts during predetermined open periods of said pulse contacts, said predetermined periods being different for each station; register means for registering each release of said line relay; and an operating circuit including said two conductors and said spotter contacts prepared by each sequential operation and release of said line relay to mark the position of said register means upon the closing of said spotter contact.

5. In a telephone system including a plurality of subscriber stations on a two conductor party line, each station having an individual designated identification in terms of the serial position of a spotter pulse in a series of digital pulses: a line relay; a loop circuit completed upon initiation of a call from one of said stations to conduct current in one direction over said two conductors for operating said line relay; dial means in said loop circuit operated to alternately release and reoperate said line relay to generate a series of digital pulses accordingly; an operating circuit prepared in response to the sequential operation and release of said line relay to conduct current in a second direction over said two conductors; normally open spotter contacts adapted to connect said two conductors; unidirectional conducting means for preventing the forward flow of current through said spotter contacts; means controlled by said dial means to close said spotter contacts during a predetermined release period of said line relay to complete said operating circuit to generate a spotter pulse; and means responsive to said spotter pulse to identify the calling station on said party line.

6. In a telephone system including a plurality of subscriber stations on a two-conductor party line, each station having an individual identification in terms of the serial position of a spotter pulse in a series of digital pulses: a line relay; a loop circuit completed upon initiation of a call from one of said stations to conduct current in one direction over said two conductors for operating said line relay; dial means including normally closed pulse contacts in said loop circuit operated to alternately release and reoperate said line relay to generate a series of digital pulses accordingly; normally open spotter contacts adapted to connect said two conductors; means controlled by said dial means to close said spotter contacts during a predetermined release period of said line relay, each station on a party line having its spotter contacts closed during a period individual to itself; and means for testing for closure of said spotter contacts during each open period of said pulse contacts, said testing means including a first relay having contacts operated to reverse polarity of the potential applied to said two conductors, a second relay operated by the reversed potential upon completion of a circuit over said two conductors, means actuated by operation of said second relay to mark the serial position of the closure of said spotter contacts, operating potential applied to said first relay by release of said line relay, and a capacitor in series with said first relay to control the duration of operation thereof whereby the serial position and duration of the test for party indicia is controlled.

7. In a telephone system having a plurality of subscriber stations on a two-conductor party line, means to identify a calling station in terms of the serial position of a spotter pulse in a series of digital impulses generated at each station comprising: a line relay; a loop circuit, including the two conductors, completed upon a call from one of said stations to operate said line relay, said loop circuit having current flowing in a predetermined direction therein; normally closed pulse contacts in said loop circuit; normally open spotter contacts connected in parallel with said pulse contacts; a unidirectional conductor serially connected in said loop circuit between said spotter contacts and said pulse contacts to prevent completion of a conducting path for current in said predetermintd direction by the closure of said spotter contacts; dial means operated to open and close said pulse contacts at regular intervals to alternately release and reoperate said line relay accordingly; means controlled by said dial means to close said spotter contacts during predetermined open periods of said pulse contacts, said predetermined periods being different for each station; register means for registering each release of said line relay; means operated by each sequential operation and release of said line relay to reverse polarity of the potential applied to said two conductors; and an operating circuit including said two conductors and said spotter contacts operated by the closure of said spotter contacts to mark the position of said register means.

8. In a telephone system including a plurality of subscriber stations on a two-conductor party line each station having an individual identification in terms of the serial position of a spotter pulse in a series of digital pulses; a line relay; a loop circuit completed upon initiation of a call from one of said stations to conduct current in one direction over said two conductors for operating said line relay; dial means including normally closed pulse contacts in said loop circuit operated to alternately release and re-operate said line relay to generate a series of digital pulses accordingly; normally open spotter contacts adapted to be closed during a predetermined digital pulse to connect said two conductors; unidirectional conducting means serially connected with said spotter contacts to prevent the flow of current in said one direction therethrough; means controlled by said dial means to close said spotter contacts during a predetermined release period of said line relay, each station on a party line having its spotter contacts closed during a period individual to itself; a marking circuit including said spotter contacts operated by current in a second direction over said two-conductors to mark the serial position of a digital pulse; a reversing relay including normally open contacts in said marking circuit operated to reverse the polarity of potential applied to said two conductors;

and means for controlling operation of said relay, said means including a source of operating potential extended to said reversing relay by release of said line relay, and a capacitor connected in series with said reversing relay and said potential, whereby the duration of operation of said relay is limited by the charge time of said capacitor.

References Cited in the file of this patent

UNITED STATES PATENTS

| | | |
|---|---|---|
| 2,619,546 | Myers | Nov. 25, 1952 |
| 2,623,125 | Lomax | Dec. 23, 1953 |
| 2,872,519 | Oxaal | Feb. 3, 1959 |